(12) United States Patent
Kim et al.

(10) Patent No.: US 12,342,410 B2
(45) Date of Patent: Jun. 24, 2025

(54) METHOD AND DEVICE FOR APPLYING PLURALITY OF DRXs IN CARRIER AGGREGATION TECHNOLOGY IN MOBILE COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 356 days.

(21) Appl. No.: 17/786,007

(22) PCT Filed: Dec. 8, 2020

(86) PCT No.: PCT/KR2020/017850
§ 371 (c)(1),
(2) Date: Jun. 16, 2022

(87) PCT Pub. No.: WO2021/125666
PCT Pub. Date: Jun. 24, 2021

(65) Prior Publication Data
US 2023/0026297 A1   Jan. 26, 2023

(30) Foreign Application Priority Data
Dec. 17, 2019 (KR) .......................... 10-2019-0168891

(51) Int. Cl.
*H04W 76/28* (2018.01)
*H04W 24/08* (2009.01)
(Continued)

(52) U.S. Cl.
CPC ........... *H04W 76/28* (2018.02); *H04W 24/08* (2013.01); *H04W 72/1273* (2013.01); *H04W 80/02* (2013.01)

(58) Field of Classification Search
CPC . H04W 76/28; H04W 24/08; H04W 72/1273; H04L 5/0053; H04L 5/0091; H04L 5/001
See application file for complete search history.

(56) References Cited

U.S. PATENT DOCUMENTS 10,645,751 B2 * 5/2020 Yi .......................... H04W 76/28
2013/0242720 A1   9/2013 Chou
(Continued)

FOREIGN PATENT DOCUMENTS

CN          109769309        5/2019
KR   10-2014-0120368        10/2014
(Continued)

OTHER PUBLICATIONS

PCT/ISA/210 Search Report issued on PCT/KR2020/017850, Mar. 9, 2021 pp. 5.
(Continued)

*Primary Examiner* — Jamal Javaid
(74) *Attorney, Agent, or Firm* — The Farrell Law Firm, P.C.

(57) ABSTRACT

The present disclosure relates to a communication technique that merges IoT technology with a 5G communication system for supporting higher data transmission rates than 4G systems, and a system therefor. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. The present invention discloses a method and device for setting and applying a plurality of Discontinuous receptions (DRXs).

15 Claims, 11 Drawing Sheets

(51) Int. Cl.
*H04W 72/1273* (2023.01)
*H04W 80/02* (2009.01)

(56) References Cited

U.S. PATENT DOCUMENTS

2013/0301421 A1 11/2013 Yi et al.
2015/0181526 A1 6/2015 Lee et al.
2018/0070405 A1 3/2018 Yi et al.

FOREIGN PATENT DOCUMENTS

| KR | 10-2021-0044152 | | 4/2021 | |
|----|----|----|----|----|
| WO | WO 2014/010993 | | 1/2014 | |
| WO | WO 2015/008967 | | 1/2015 | |
| WO | WO-2015008967 A1 | * | 1/2015 | ............. H04B 17/18 |
| WO | WO 2020/022694 | | 1/2020 | |

OTHER PUBLICATIONS

PCT/ISA/237 Written Opinion issued on PCT/KR2020/017850, Mar. 9, 2021, pp. 3.
Intel Corporation, 'C-DRX enhancement in NR', R2-1707026, 3GPP TSG RAN WG2 Meeting NR Ad hoc, Qingdao, China, Jun. 17, 2017, pp. 6.
CATT, 'Summary of UE Power Saving Schemes', R1-1903622, 3GPP TSG RAN WG1 #96, Athens, Greece, Mar. 3, 2019, pp. 27.
Ericsson, 'Draft LS on secondary DRX group', 3GPP TSG-RAN2 Meeting #108, R2-1916509, Reno, USA, Nov. 18-22, 2019, pp. 2.
3GPP TS 38.321 V15.7.0 (Sep. 2019), 3rd Generation Partnership Project; Technical Specification Group Radio Access Network; NR; Medium Access Control (MAC) protocol specification (Release 15), pp. 78.
3GPP TS 38.213 V15.7.0 (Sep. 2019), 3rd Generation Partnership Project; Technical Specification Group Radio Access Network; NR; Physical layer procedures for control (Release 15), pp. 108.
3GPP TS 38.214 V15.7.0 (Sep. 2019), 3rd Generation Partnership Project; Technical Specification Group Radio Access Network; NR; Physical layer procedures for data (Release 15), pp. 106.
European Search Report dated Oct. 12, 2022 issued in counterpart application No. 20903941.1-1215, 8 pages.
Chinese Office Action dated Oct. 24, 2024 issued in counterpart application No. 202080088423.7, 17 pages.
Oppo et al., "UE Behaviour on DRX Timer Operation", R2-1801763, 3GPP TSG-RAN2 #101, Feb. 26-Mar. 2, 2018, 7 pages.
Ericsson et al., "Avoiding Using Long DRX Cycle When Short DRX Cycle is Configured and Data in Onging (Option 1)", R2-1812154, 3GPP TSG-RAN WG2#103, Aug. 20-24, 2018, 5 pgs.
Chinese Office Action dated Apr. 28, 2025 issued in counterpart application No. 202080088423.7, 10 pages.

* cited by examiner

METHOD AND DEVICE FOR APPLYING PLURALITY OF DRXs IN CARRIER AGGREGATION TECHNOLOGY IN MOBILE COMMUNICATION SYSTEM

PRIORITY

This application is a National Phase Entry of PCT International Application No. PCT/KR2020/017850, which was filed on Dec. 8, 2020, and claims priority to Korean Patent Application No. 10-2019-0168891, which was filed on Dec. 17, 2019, the entire content of each of which is incorporated herein by reference.

TECHNICAL FIELD

The disclosure relates to a method and apparatus for configuring and applying multiple discontinuous receptions (DRXs).

BACKGROUND ART

To meet the ever increasing demand for wireless data traffic since the commercialization of 4G communication systems, efforts have been made to develop improved 5G or pre-5G communication systems. As such, 5G or pre-5G communication systems are also called "beyond 4G network system" or "post Long Term Evolution (LTE) system". To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. Also, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like. Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANS as a big data processing technique described above may be an instance of convergence of 5G technology and IoT technology.

On the other hand, DRX is applied to minimize power consumption of the terminal, and is a technology for monitoring only a preset PDCCH to obtain scheduling information. DRX can be operated in both idle mode and connected mode, and the operation methods are somewhat different.

DISCLOSURE OF INVENTION

Technical Problem

As only two types of DRX cycles can be configured in the related art, there is a problem in efficiency, such as not being able to dynamically change the DRX cycle according to various DRB characteristics, traffic patterns, buffer states, and the like. Accordingly, an object of the disclosure is to provide a method of applying multiple DRX configurations to a plurality of serving cells.

Solution to Problem

To solve the above problem, a method performed by a terminal in a wireless communication system according to an embodiment of the disclosure may include:
receiving, from a base station, first discontinuous reception (DRX) configuration information and second DRX configuration information; performing physical downlink control channel (PDCCH) monitoring in a first DRX group using a first active time based on the first DRX configuration information, and performing PDCCH monitoring in a second DRX group using a second active time based on the second DRX configuration information; receiving information associated with a DRX cycle in one of the first DRX group and the second DRX group; and starting a timer for the DRX cycle determined by the information after a specific time point in each of the first DRX group and the second DRX group, and wherein the first DRX group and the second DRX group may be determined based on a frequency range (FR).

In addition, a method performed by a base station in a wireless communication system according to an embodiment of the disclosure may include: transmitting, to a terminal, first discontinuous reception (DRX) configuration information and second DRX configuration information; transmitting a physical downlink control channel (PDCCH) to a first DRX group using a first active time based on the first DRX configuration information, and transmitting the PDCCH to a second DRX group using a second active time based on the second DRX configuration information; and transmitting information associated with a DRX cycle to one of the first DRX group and the second DRX group, wherein a timer for the DRX cycle associated with the information are started in each of the first DRX group and the second DRX group after a specific time point based on a reception of the information by the terminal, and wherein the first DRX group and the second DRX group may be determined based on a frequency range (FR).

In addition, a terminal in a wireless communication system according to an embodiment of the disclosure may include: a transceiver; and a controller configured to: control the transceiver to receive, from a base station, first discontinuous reception (DRX) configuration information and second DRX configuration information; perform physical downlink control channel (PDCCH) monitoring in a first DRX group using a first active time based on the first DRX configuration information, and perform PDCCH monitoring in a second DRX group using a second active time based on the second DRX configuration information; control the transceiver to receive information associated with a DRX cycle in one of the first DRX group and the second DRX group; and start a timer for the DRX cycle determined by the information after a specific time point in each of the first DRX group and the second DRX group, and wherein the first DRX group and the second DRX group may be determined based on a frequency range (FR).

In addition, a base station in a wireless communication system according to an embodiment of the disclosure may include: a transceiver; and a controller configured to: control the transceiver to transmit, to a terminal, first discontinuous reception (DRX) configuration information and second DRX configuration information; control the transceiver to transmit a physical downlink control channel (PDCCH) to a first DRX group using a first active time based on the first DRX configuration information, and transmitting the PDCCH to a second DRX group using a second active time based on the second DRX configuration information; and control the transceiver to transmit information associated with a DRX cycle to one of the first DRX group and the second DRX group, wherein a timer for the DRX cycle associated with the information are started in each of the first DRX group and the second DRX group after a specific time point based on a reception of the information by the terminal, and wherein the first DRX group and the second DRX group may be determined based on a frequency range (FR).

Advantageous Effects of Invention

According to an embodiment of the disclosure, one DRX is made correspond to a group of one or more serving cells, and corresponding DRX is applied to serving cells belonging to one group, so that there is an effect of minimizing power consumption of the terminal.

MODE FOR THE INVENTION

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the following description of the disclosure, descriptions of well-known functions and structures incorporated herein may be omitted to avoid obscuring the subject matter of the disclosure. Next, embodiments of the disclosure will be described with reference to the accompanying drawings.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in the standards for 3gPP LTE (3rd Generation Partnership Project Long Term Evolution). However, the disclosure is not limited by the above terms and names, and can be equally applied to systems conforming to other standards. In the disclosure, "eNB" may be used interchangeably with "gNB" for convenience of description. That is, a base station described as an eNB may indicate a gNB.

In the following description of the disclosure, descriptions of well-known functions and structures incorporated herein may be omitted to avoid obscuring the subject matter of the disclosure. Next, embodiments of the disclosure will be described with reference to the accompanying drawings.

Figure 1:
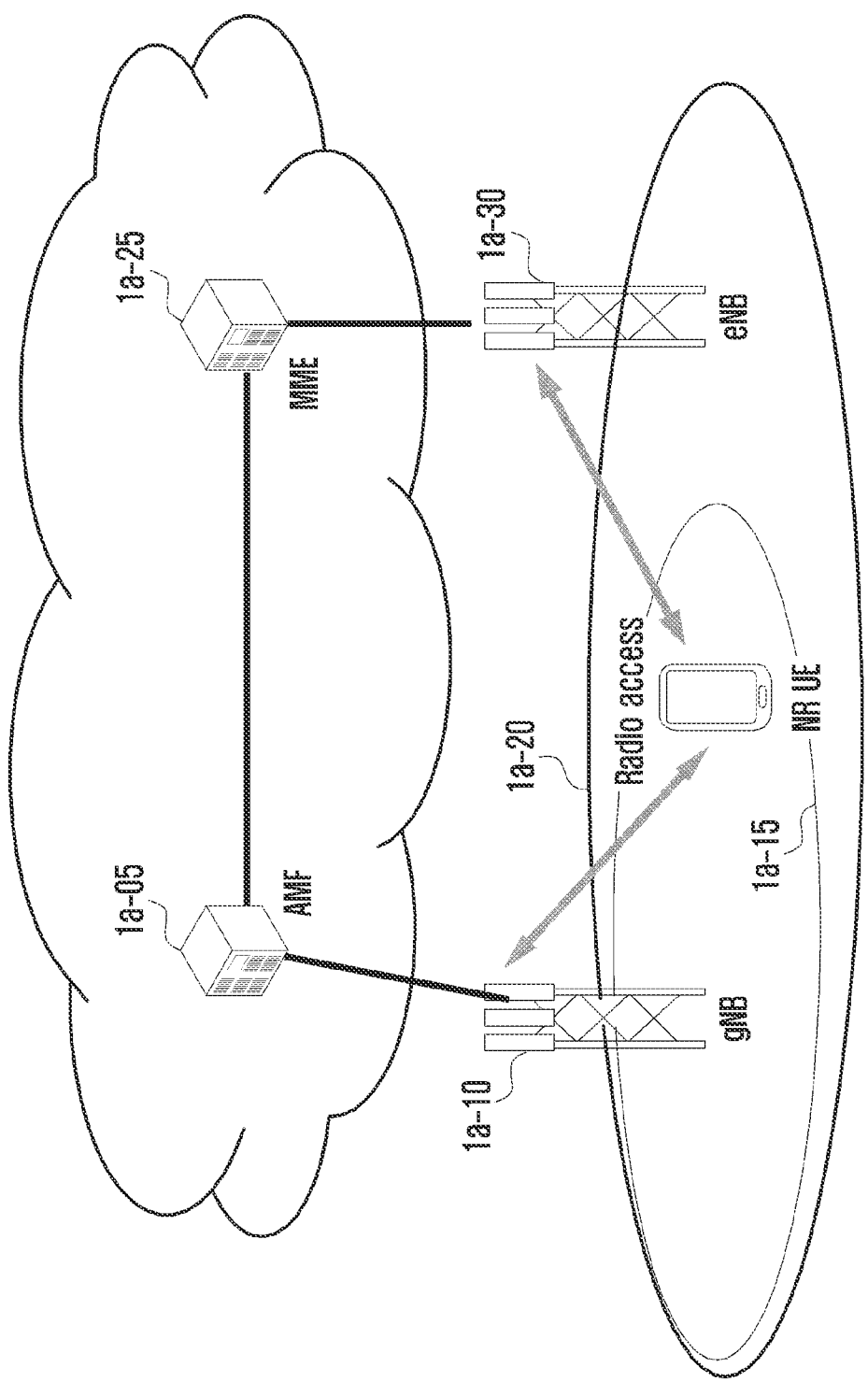
FIG. 1 is a diagram showing the architecture of a next-generation mobile communication system.

FIG. 1 is a diagram showing the EN-DC architecture of a next-generation mobile communication system.

EN-DC refers to the dual connectivity of EUTRAN (LTE system) and NR (next-generation mobile communication system), and is a scenario in which one UE is simultaneously connected to two different types of systems to receive a service.

With reference to FIG. 1, as shown, the radio access network of the next-generation mobile communication system is composed of a next-generation base station (New Radio Node B, hereinafter gNB) 1a-10 and an access and mobility management function (AMF) (New Radio core network) 1a-05. A user terminal (New Radio user equipment, hereinafter NR UE or terminal) 1a-15 connects to an external network through the gNB 1a-10 and the AMF 1a-05.

In FIG. 1, the gNB 1a-10 corresponds to an evolved node B (eNB) of the existing LTE system. The gNB 1a-10 is connected to the NR UE 1*a*-15 through a radio channel, and it can provide a more superior service than that of the existing node B. Since all user traffic are serviced through shared channels in the next-generation mobile communication system, there is a need for an entity that performs scheduling by collecting status information, such as buffer states, available transmission power states, and channel states of individual UEs, and the gNB 1*a*-10 takes charge of this. One gNB normally controls a plurality of cells. To implement ultra-high-speed data transmission compared with existing LTE, a bandwidth beyond the existing maximum bandwidth may be utilized, and a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE is applied. The AMF 1*a*-05 performs functions such as mobility support, bearer configuration, and quality of service (QOS) configuration. The AMF is an entity taking charge of not only mobility management but also various control functions for the UE, and is connected to a plurality of base stations. In addition, the next-generation mobile communication system may interwork with the existing LTE system, and the AMF is connected to the MME 1*a*-25 through a network interface. The MME may be connected to an eNB 1*a*-30 being an existing base station. In the EN-DC scenario, the gNB may be controlled by being connected to the eNB.

Figure 2:
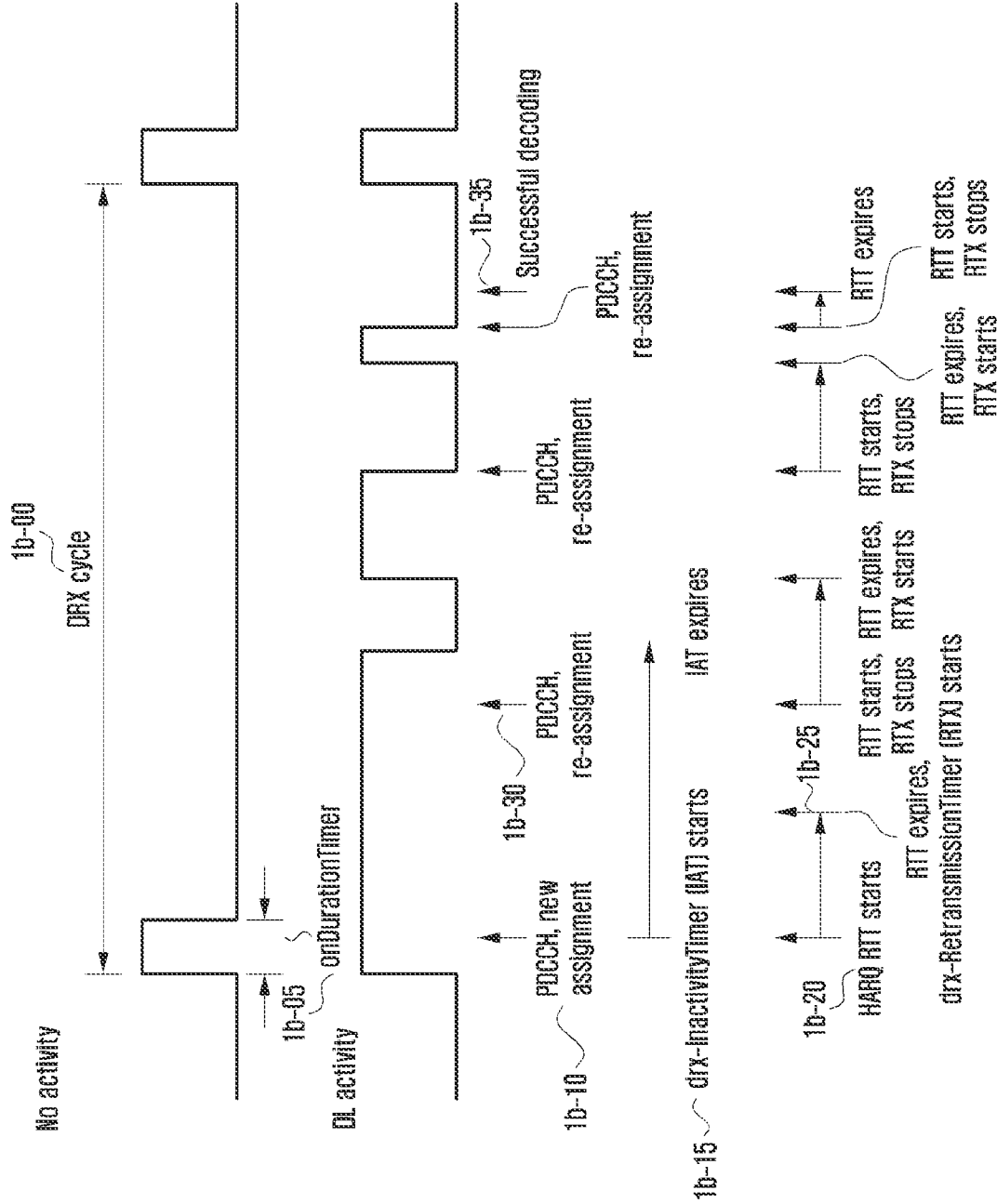
FIG. 2 is a diagram for explaining DRX operation in the existing LTE technology.

FIG. 2 is a diagram for explaining DRX operation.

DRX is applied to minimize power consumption of the UE, and is a technology for monitoring only a preset PDCCH to obtain scheduling information. DRX can be operated in both idle mode and connected mode, and the operation methods are somewhat different. The disclosure relates to connected mode.

Continuous monitoring of the PDCCH to obtain scheduling information will cause the UE to consume large power. The basic DRX operation has a DRX cycle 1*b*-00 and monitors the PDCCH only for an on-duration period 1*b*-05. In connected mode, two values of long DRX and short DRX are set for the DRX cycle. A long DRX cycle is applied in a general case, and if necessary, the base station may trigger a short DRX cycle by using a MAC control element (CE). After a specific time elapses, the UE changes from a short DRX cycle to a long DRX cycle.

Initial scheduling information for a specific UE is provided only on the preset PDCCH. Accordingly, the UE can minimize power consumption by periodically monitoring only the preset PDCCH. If scheduling information for a new packet is received on the PDCCH during the on-duration period 1*b*-05 (1*b*-10), the UE starts the DRX inactivity timer (1*b*-15). The UE maintains an active state during the DRX inactivity timer. That is, PDCCH monitoring is continued.

Also, the HARQ RTT timer is started (1*b*-20). The HARQ RTT timer is applied to prevent the UE from unnecessarily monitoring the PDCCH during the HARQ round trip time (RTT), and the UE does not need to perform PDCCH monitoring during this timer running time. However, while the DRX inactivity timer and the HARQ RTT timer are running simultaneously, the UE continues monitoring the PDCCH based on the DRX inactivity timer. When the HARQ RTT timer expires, the DRX retransmission timer is started (1*b*-25). While the DRX retransmission timer is running, the UE must perform PDCCH monitoring. In general, during the DRX retransmission timer running time, scheduling information for HARQ retransmission is received (1*b*-30). Upon receiving the scheduling information, the UE immediately stops the DRX retransmission timer and starts the HARQ RTT timer again. The above operation continues until the packet is successfully received (1*b*-35).

Configuration information related to the DRX operation in connected mode is delivered to the UE through a RRC-ConnectionReconfiguration message. The on-duration timer, DRX inactivity timer, and DRX retransmission timer are defined by the number of PDCCH subframes. After a timer is started, when a configured number of subframes defined as a PDCCH subframes pass, the timer expires. All downlink subframes belong to PDCCH subframes in FDD, and downlink subframes and special subframes correspond to them in TDD. In TDD, a downlink subframe, an uplink subframe, and a special subframe exist in the same frequency band. Among them, the downlink subframe and the special subframe are considered as a PDCCH subframe.

The base station may configure two states of longDRX and shortDRX. In general, the base station will use one of the two states in consideration of power preference indication information reported from the UE, UE mobility record information, and characteristics of a configured data radio bearer (DRB). The transition between the two states is made by expiration of a specific timer or transmission of a specific MAC CE to the UE.

In the existing LTE technology, since only two DRX cycles can be configured, it is not possible to dynamically change the DRX cycle according to various DRB characteristics, traffic patterns, and buffer states.

The disclosure is characterized in that a plurality of DRXs can be configured, and one or more serving cells apply one of the configured plural DRXs. In particular, to minimize UE power consumption, it is characterized in that a group of one or more serving cells are made to correspond to one DRX, and the serving cells belonging to the group apply this DRX. For example, to minimize UE power consumption, it is desirable to apply the same DRX to serving cells operating in the same radio frequency (RF) chain.

In the case of carrier aggregation (CA), the base station may separately provide DRX applied to those serving cells belonging to frequency range 1 (FR1) and DRX applied to those serving cells belonging to frequency range 2 (FR2). In the disclosure, serving cells belonging to FR1 are referred to as a master DRX group, and serving cells belonging to FR2 are referred to as a secondary DRX group. Alternatively, a DRX group to which the PCell belongs may be referred to as a master DRX group, and a DRX group not including the PCell may be referred to as a secondary DRX group.

Figure 3:
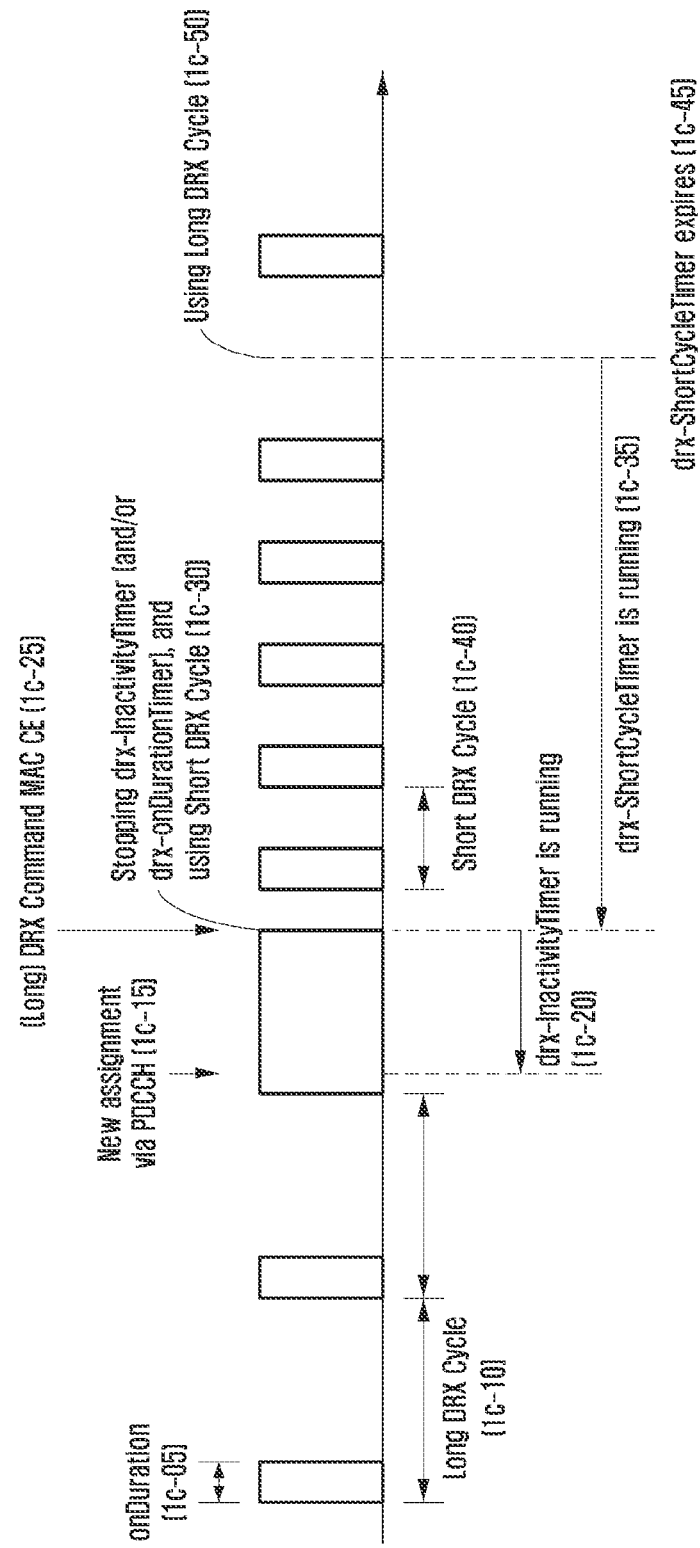
FIG. 3 is a diagram for explaining DRX operation when a (long) DRX command MAC CE is received.

FIG. 3 is a diagram for explaining DRX operation when a (long) DRX command MAC CE is received.

The UE applies the long DRX cycle (1*c*-10) by default, and monitors the PDCCH during the onDuration period (1*c*-05) in each cycle.

When scheduling information is obtained during the onDuration period (1*c*-15), the UE starts drx-InactivityTimer (1*c*-20). The UE may receive a long DRX command MAC CE or a DRX command MAC CE from the base station during the active time (1*c*-25). The long DRX command MAC CE is transmitted from the base station when instructing the use of the long DRX cycle, and the DRX command MAC CE is transmitted when instructing the use of the short DRX cycle. When drx-onDurationTimer or drx-InactivityTimer is running, this is regarded as the active time, and the UE performs PDCCH monitoring.

Upon receiving one of the above MAC CEs, the UE stops drx-Inactivity Timer timer and drx-onDuration Timer timer being running (1*c*-30), and uses the long DRX cycle or short DRX cycle. If the short DRX cycle is used (1c-40), the UE starts drx-ShortCycleTimer (1c-35). When drx-ShortCycleTimer expires (1c-45), the UE uses the long DRX cycle (1c-50).

When the UE uses short DRX or long DRX, it starts the onDuration timer at a time when the following equation is satisfied, resulting in an onDuration period.
[(SFN×10)+subframe number] modulo (drx-ShortCycle)=(drx-StartOffset) modulo (drx-ShortCycle) is applied if the short DRX cycle is being used;
[(SFN×10)+subframe number] modulo (drx-LongCycle)=drx-StartOffset is applied if the long DRX cycle is being used; and when a subframe satisfying the above equation starts, drx-onDuration Timer is started after drx-SlotOffset.

Figure 4:
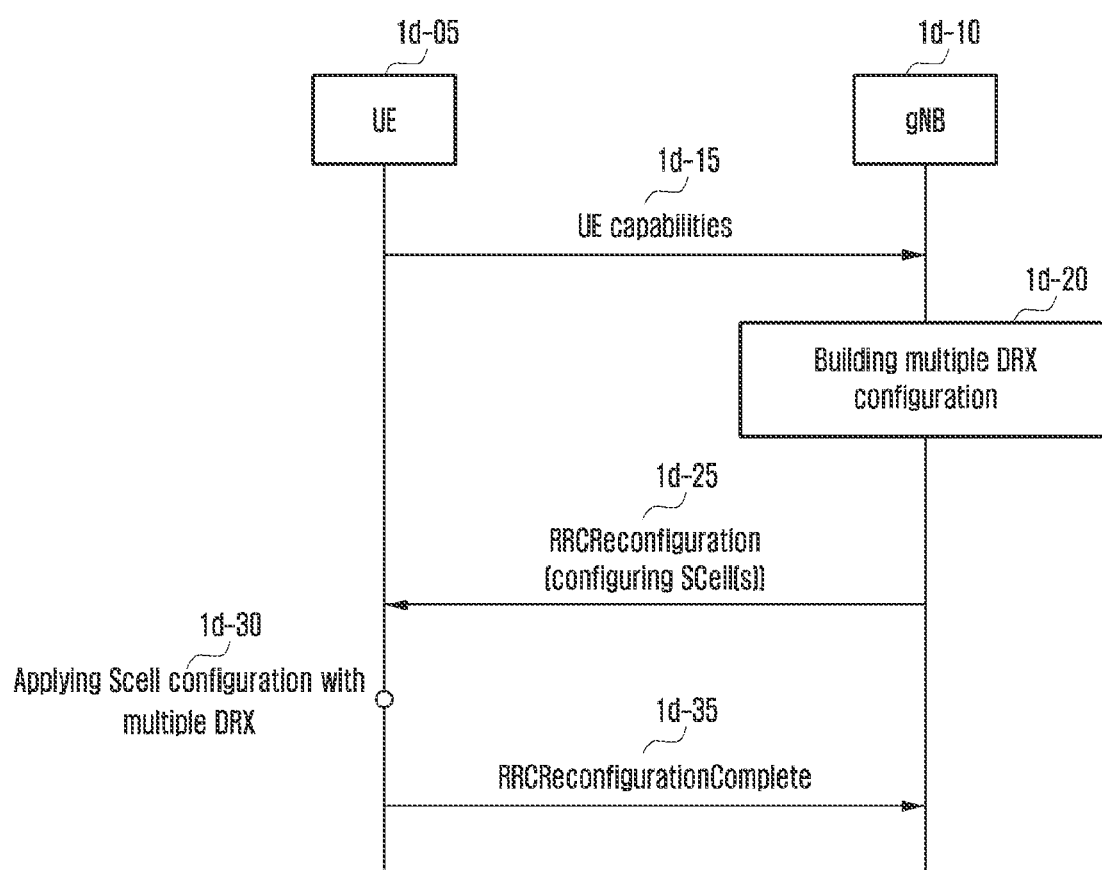
FIG. 4 is a flow diagram of a method for providing plural pieces of DRX configuration information in the disclosure.

FIG. 4 is a flow diagram of a method for providing plural pieces of DRX configuration information in the disclosure.

The UE 1d-05 reports its capability information to the base station 1d-10 (1d-15). This capability information includes an indicator indicating that the UE can configure multiple DRXs when plural serving cells are configured. The base station composes plural pieces of DRX configuration information to be configured to the UE (1d-20). In the disclosure, it is considered to provide two pieces of DRX configuration information. Here, it is necessary to configure the serving cells to which each DRX configuration information is to be applied. In the disclosure, the following options are considered.

Option 1: the serving cell belonging to FR1 applies first DRX configuration information, and the serving cell belonging to FR2 applies second DRX configuration information Option 2: define an indicator indicating whether to apply which DRX configuration information for each serving cell configuration information Option 3: the UE determines the serving cells to which the two pieces of DRX configuration information are to be applied.

In the case of option 1, as the DRX configuration information to be applied is automatically determined according to the FR to which the serving cell belongs, there is no need for the base station to separately transmit an indicator indicating this to the UE. In option 1, it is assumed that the UE has separate RF modems for FR1 and FR2. Hence, if not, the desired performance improvement may not be achieved.

In the case of option 2, the base station must know in advance DRX group information that is advantageous for the UE to save power consumption. To this end, the UE must report it to the base station through a capability information reporting process or a specific reporting process. In the case of option 3, the base station transmits only two pieces of DRX configuration information without DRX group information to the UE through an RRCReconfiguration message. However, it is assumed that the PCell always applies the first DRX configuration information. The UE transmits the base station serving cell information (DRX group information) to which each DRX configuration information is applied through an RRCReconfigurationComplete message being a response message to the RRCReconfiguration message. In option 3, as the UE directly indicates serving cells to which each DRX configuration information is applied in consideration of configured SCells, there is no need to report in advance information necessary for configuring the DRX group to the base station. The base station configures an SCell together with plural pieces of DRX configuration information to the connected mode UE (1d-25). Then, corresponding DRX configuration information is applied to each serving cell (1d-30). The UE transmits an RRCReconfigurationComplete message to the base station as a response message to the RRCReconfiguration message (1d-35). Serving cell information (DRX group information) to which each DRX configuration information is applied may be included in the above message. The disclosure is characterized in that DRX configuration information applied to the master DRX group includes all related parameters as before (drx-onDuration Timer, drx-Inactivity Timer, drx-HARQ-RTT-TimerDL, drx-HARQ-RTT-TimerUL, drx-RetransmissionTimerDL, drx-RetransmissionTimerUL, drx-LongCycleStartOffset, drx-ShortCycle, drx-ShortCycleTimer, drx-SlotOffset), and DRX configuration information applied to the secondary DRX group includes only drx-onDurationTimer and drx-Inactivity Timer. Since the scheduling units in FR1 and FR2 are different, even if only the above two parameters are separately provided, there is an advantage in terms of UE power consumption. Further, even if the above two parameters are separately provided for each DRX group, the physical layer or UE requirements are not significantly affected.

In the disclosure, drx-onDuration Timer and drx-Inactivity Timer applied in the secondary DRX group are respectively called drx-onDurationTimer2 and drx-Inactivity Timer2, and are distinguished from the parameters applied in the master DRX group.

The disclosure proposes UE operation that matches the DRX cycles applied to the two DRX groups when drx-onDuration Timer2 and drx-InactivityTimer2 are introduced.

Figure 5:
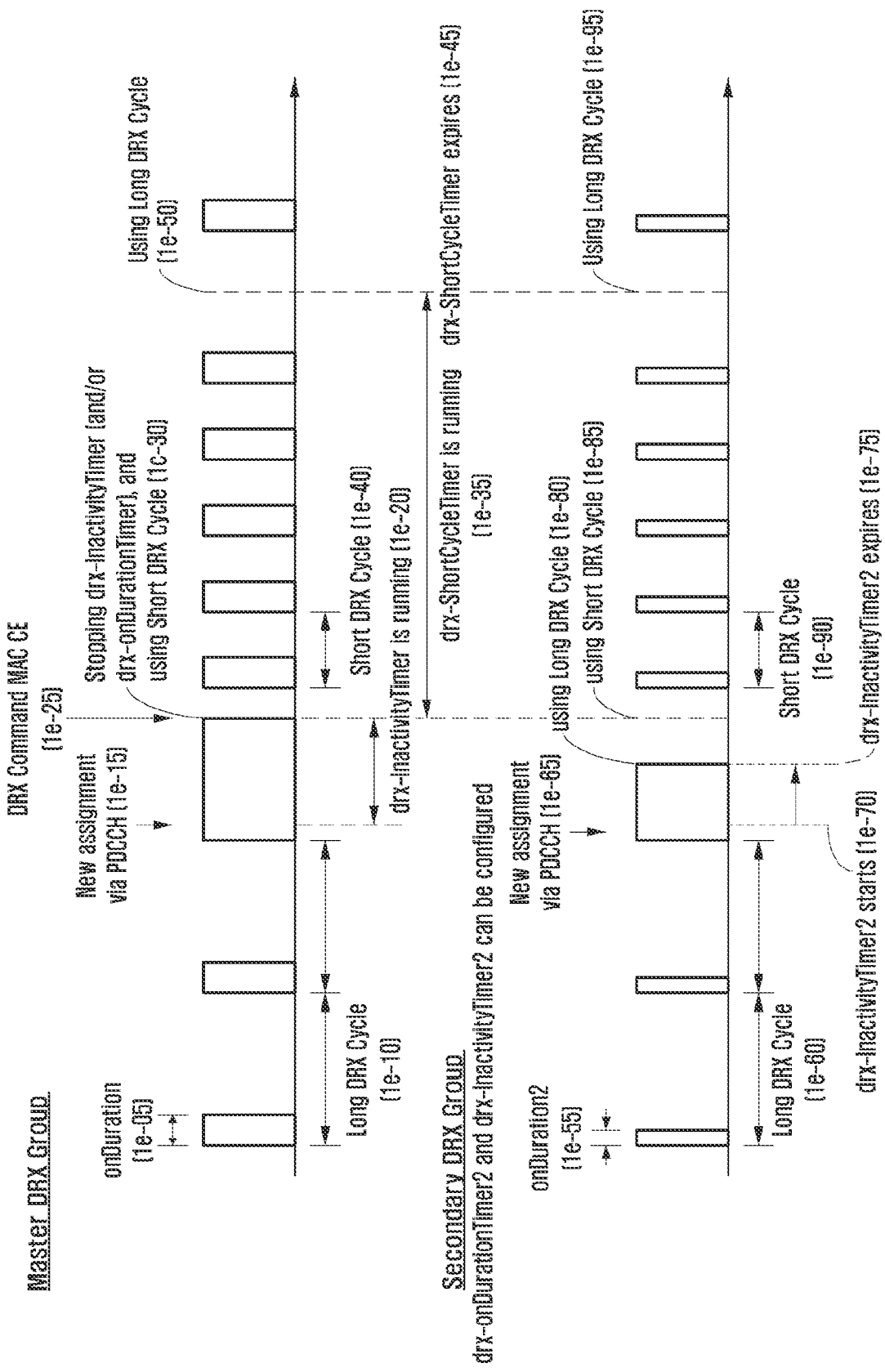
FIG. 5 is a diagram for explaining a first scenario in the disclosure.

FIG. 5 is a diagram for explaining a first scenario in the disclosure.

In the first scenario, when the UE receives a DRX command MAC CE from one serving cell belonging to one DRX group, serving cells belonging to the other DRX group are not in the active time.

The UE applies long DRX cycles 1e-10 and 1e-60 to the two DRX groups by default, and monitors the PDCCH during onDuration periods 1e-05 and 1e-55 in each cycle. Here, as the DRX groups apply drx-onDurationTimer and drx-onDurationTimer2, respectively, the onDuration periods in the two DRX groups are different.

When scheduling information is obtained (1e-15) during the onDuration period in the master DRX group, the UE starts drx-Inactivity Timer (1e-20). When scheduling information is also obtained (1e-65) during the onDuration period in the secondary DRX group, the UE starts drx-Inactivity Timer2 (1e-70). The UE may receive a DRX command MAC CE (or, long DRX command MAC CE) (1e-25) from the base station during the active time in the master DRX group. Upon receiving one of the MAC CEs, the UE stops drx-Inactivity Timer timer and drx-onDuration Timer timer being running (1e-30), and uses a short DRX cycle (or long DRX).

If the short DRX cycle is used (1e-40), the UE starts drx-ShortCycleTimer (1e-35). Here, to match the DRX cycles applied to the two DRX groups, when one DRX group uses the short DRX cycle, the other DRX group also uses the short DRX cycle at the same time. However, in the secondary DRX group, if it is not in the active time because drx-Inactivity Timer2 has already expired or is not scheduled, as there is no running drx-Inactivity Timer2 or drx-onDuration Timer2, there is no need to stop the related timers. When drx-ShortCycleTimer expires (1e-45), the UE uses long DRX cycles for the two groups (1e-50, 1e-95).

Figure 6:
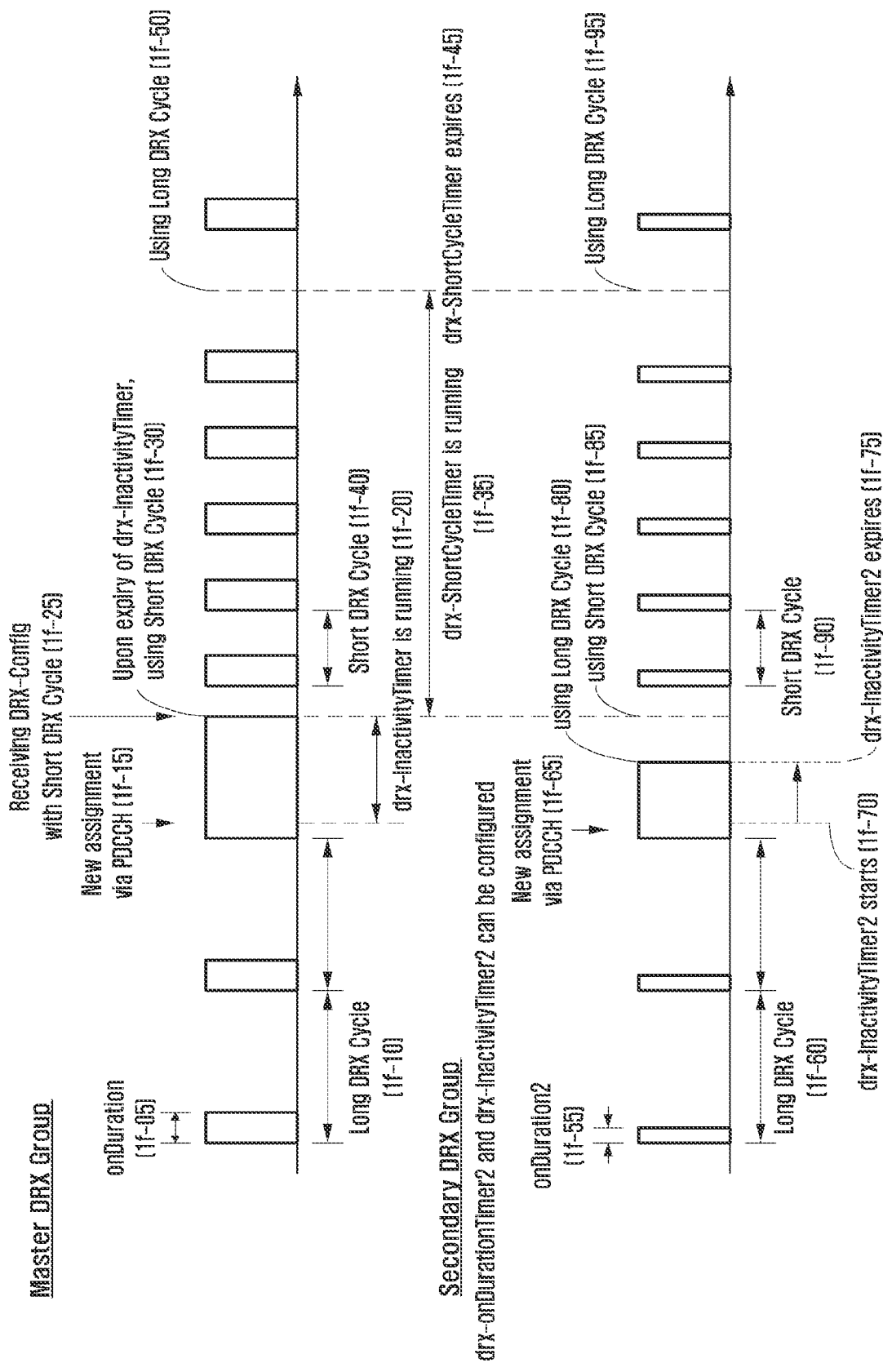
FIG. 6 is a diagram for explaining a second scenario in the disclosure.

FIG. 6 is a diagram for explaining a second scenario in the disclosure.

In the second scenario, when the UE receives DRX configuration information including short DRX configuration information from one serving cell belonging to one DRX group, serving cells belonging to the other DRX group are not in the active time.

The UE applies long DRX cycles 1*f*-10 and 1*f*-60 to the two DRX groups by default, and monitors the PDCCH during onDuration periods 1*f*-05 and 1*f*-55 in each cycle. Here, as the DRX groups apply drx-onDurationTimer and drx-onDurationTimer2, respectively, the onDuration periods in the two DRX groups are different.

When scheduling information is obtained (1*f*-15) during the onDuration period in the master DRX group, the UE starts drx-InactivityTimer (1*f*-20). When scheduling information is also obtained (1*f*-65) during the onDuration period in the secondary DRX group, the UE starts drx-Inactivity Timer2 (1*f*-70). The UE may receive DRX configuration information (1*f*-25) from the base station during the active time in the master DRX group. If short DRX configuration information (or long DRX configuration information) is included in the received DRX configuration information, the UE uses a short DRX cycle (or long DRX) (1*f*-30) when running drx-Inactivity Timer expires.

If the short DRX cycle is used (1*f*-40), the UE starts drx-ShortCycleTimer (1*f*-35). Here, to match the DRX cycles applied to the two DRX groups, when one DRX group uses the short DRX cycle, the other DRX group also uses the short DRX cycle at the same time. However, in the secondary DRX group, it is not in the active time because drx-Inactivity Timer2 has already expired or is not scheduled. As there is no running drx-Inactivity Timer2 or drx-onDuration Timer2, there is no need to stop the related timers. When drx-ShortCycleTimer expires (1*f*-45), the UE uses long DRX cycles for the two groups (1*f*-50, 1*f*-95).

There may be a case where drx-onDuration Timer or drx-InactivityTimer is not running in the master DRX group when a (long) DRX command MAC CE or DRX configuration information is received in the secondary DRX group. In this case, the UE operation for the master DRX group and the UE operation for the secondary DRX group in FIGS. 5 and 6 are interchanged for application.

Figure 7:
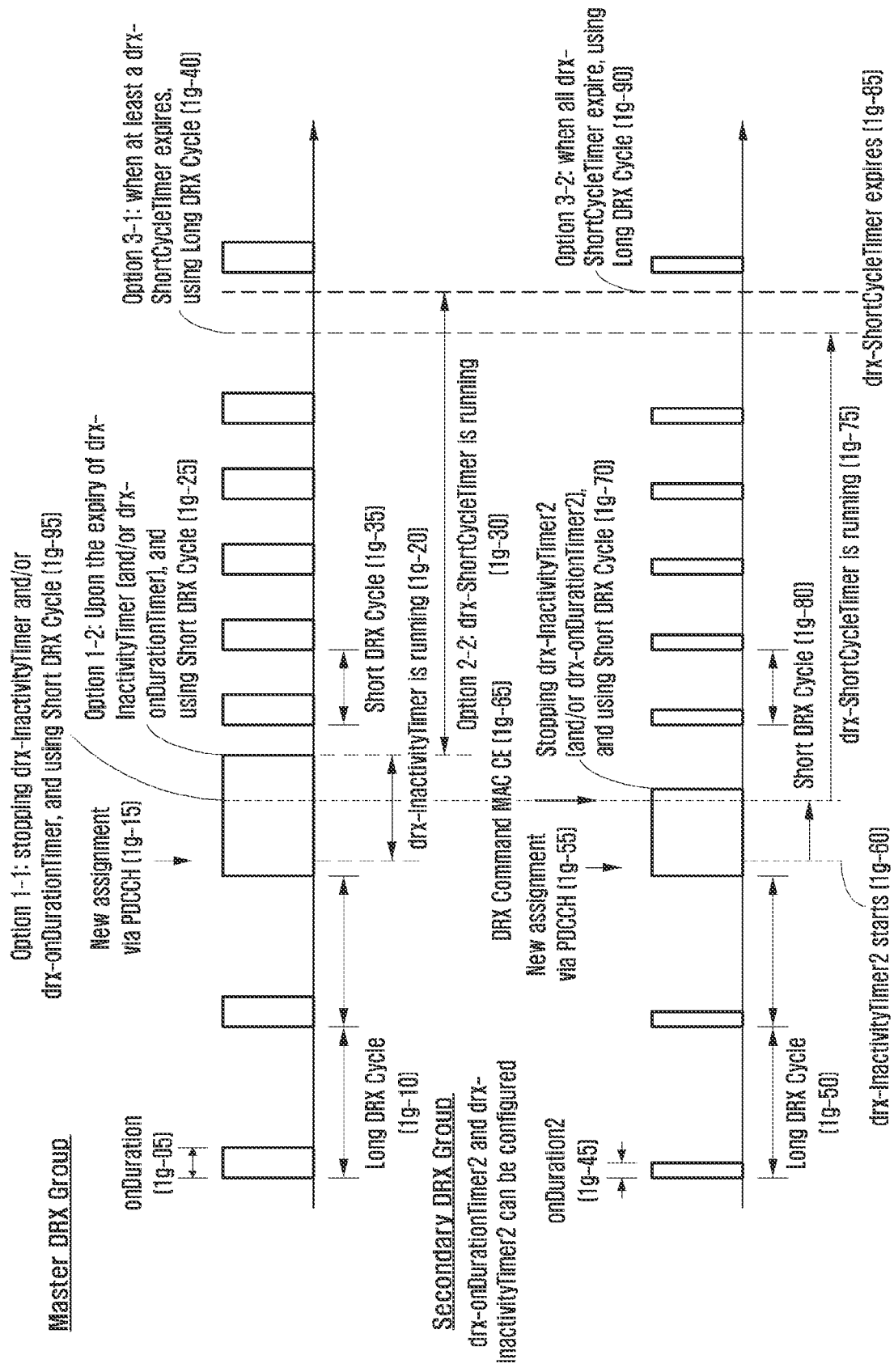
FIG. 7 is a diagram for explaining a third scenario in the disclosure.

FIG. 7 is a diagram for explaining a third scenario in the disclosure.

In the third scenario, when the UE receives a DRX command MAC CE or DRX configuration information including short DRX configuration information from one serving cell belonging to one DRX group, serving cells belonging to the other DRX group are in the active time.

The UE applies long DRX cycles 1*g*-10 and 1*g*-50 to the two DRX groups by default, and monitors the PDCCH during onDuration periods 1*g*-05 and 1*g*-45 in each cycle. Here, as the DRX groups apply drx-onDurationTimer and drx-onDuration Timer2, respectively, the onDuration periods in the two DRX groups are different.

When scheduling information is obtained (1*g*-15) during the onDuration period in the master DRX group, the UE starts drx-InactivityTimer (1*g*-20). When scheduling information is also obtained (1*g*-55) during the onDuration period in the secondary DRX group, the UE starts drx-Inactivity Timer2 (1*g*-60). The UE may receive a DRX command MAC CE or DRX configuration information (1*g*-65) from the base station during the active time in the secondary DRX group.

Upon receiving a DRX command MAC CE (or, long DRX command MAC CE), the UE stops drx-Inactivity Timer timer and drx-onDuration Timer timer being running, and uses a short DRX cycle (or long DRX). Otherwise, if short DRX configuration information (or long DRX configuration information) is included in the received DRX configuration information, the UE uses a short DRX cycle (or long DRX) (1*g*-70) when running drx-Inactivity Timer expires. If the short DRX cycle is used (1*g*-80), the UE starts drx-ShortCycleTimer (1*g*-75).

Here, to match the DRX cycles applied to the two DRX groups, when one DRX group uses the short DRX cycle, the other DRX group also uses the short DRX cycle at the same time. At this time, in the master DRX group, it may still be in the active time for reasons such as drx-Inactivity Timer has not yet expired. The disclosure proposes the following UE operation for a case where a DRX command MAC CE or DRX configuration information is received from the base station during the active time and the applied DRX cycle is changed in one DRX group, but the other DRX group is still in the active time.

Option 1-1 (1*g*-95): when a DRX command MAC CE or DRX configuration information is received from the base station during the active time and the applied DRX cycle is changed in one DRX group, the other DRX group in the active time also stops drx-Inactivity Timer or drx-onDuration Timer and applies the changed DRX cycle. This has an advantage in saving UE power consumption.

Option 1-2 (1*g*-25): when a DRX command MAC CE or DRX configuration information is received from the base station during the active time and the applied DRX cycle is changed in one DRX group, the other DRX group in the active time does not stop drx-Inactivity Timer or drx-onDuration Timer and applies the changed DRX cycle when all of the above timers expire.

This has an advantage in guaranteeing the degree of freedom of scheduling for each DRX group.

Option 1-3: when a DRX command MAC CE is received from the base station during the active time and the applied DRX cycle is changed in one DRX group, the other DRX group in the active time also stops drx-Inactivity Timer or drx-onDuration Timer and applies the changed DRX cycle. On the other hand, when DRX configuration information is received from the base station during the active time and the applied DRX cycle is changed in one DRX group, the other DRX group in the active time does not stop drx-Inactivity-Timer or drx-onDuration Timer and applies the changed DRX cycle when all of the above timers expire.

If the short DRX cycle is applied (1*g*-35), drx-ShortCycleTimer is started in response thereto. If option 1-1 is applied, there is no problem in starting one drx-ShortCycleTimer regardless of the DRX group because the changed short DRX cycle is applied at the same time in the two DRX groups.

However, if option 1-2 is applied, as the timings of applying the changed short DRX cycle in the two DRX groups are different, although the base station sets one value for drx-ShortCycleTimer, it is possible to consider a method of starting drx-ShortCycleTimer for each DRX group. In this case, new UE operation is required according to the operation of the two timers.

Option 2-1: one drx-ShortCycleTimer exists regardless of the DRX group. This timer is started when the master DRX group (or, the DRX group to which the PCell belongs) uses the short DRX cycle, and all the two DRX groups use the long DRX cycle when the timer expires.

Option 2-2 (1*g*-30, 1*g*-75): drx-ShortCycleTimer may be started for each DRX group. In this case, the start time and expiration time of the two timers may be different from each other.

In option 2-2, one of the following options is considered for the DRX cycle applied depending on whether the two timers are running.

Option 3-1 (1g-40): when at least one drx-ShortCycleTimer expires, the long DRX cycle is applied in the two DRX groups.

Option 3-2 (1g-90): when both drx-ShortCycleTimers expire, the long DRX cycle is applied in the two DRX groups.

There may be a case where drx-onDuration Timer or drx-InactivityTimer is not running in the secondary DRX group when a (long) DRX command MAC CE or DRX configuration information is received in the master DRX group. In this case, the UE operation for the master DRX group and the UE operation for the secondary DRX group in FIG. 7 are interchanged for application.

Figure 8:
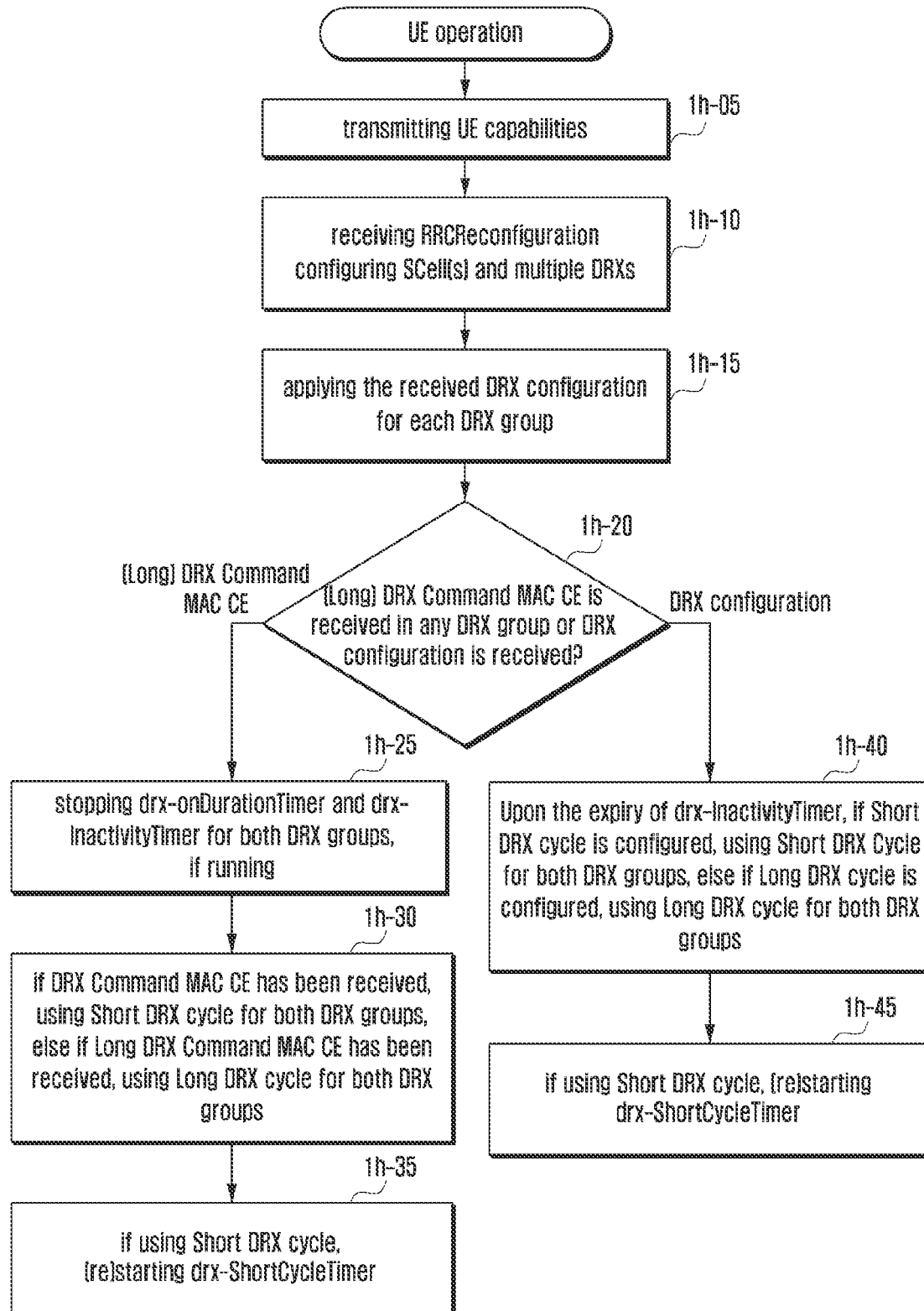
FIG. 8 is a diagram for explaining UE operation in the disclosure.

FIG. 8 is a diagram for explaining UE operation in the disclosure.

At step 1h-05, the UE reports its capability information to the base station. This capability information includes an indicator indicating that the UE can configure a plurality of DRXs when a plurality of serving cells are configured.

At step 1h-10, the UE receives an SCell configuration from the base station. Here, plural pieces of DRX configuration information may also be received, and the SCell configuration information includes an indicator indicating DRX to be applied for each serving cell. The PCell always applies the first DRX configuration information.

At step 1h-15, the UE applies the configured DRX to serving cells belonging to the corresponding group.

At step 1h-20, the terminal determines whether a (long) DRX command MAC CE or DRX configuration information is received from the base station.

If a (long) DRX command MAC CE is received, at step 1h-25, the UE stops drx-onDuration Timer and drx-InactivityTimer being running.

In step 1h-30, if a DRX command MAC CE is received, the UE uses the short DRX cycle for the two DRX groups, if a long DRX command MAC CE is received, the UE uses the long DRX cycle for the two DRX groups.

If the short DRX cycle is used, at step 1h-35, the UE (re) starts drx-ShortCycle Timer.

At step 1h-40, if short DRX configuration information is received, the UE uses the short DX cycle for the two DRX groups when drx-Inactivity Timer expires; if long DRX configuration information is received, the UE uses the short DX cycle for the two DRX groups when drx-Inactivity Timer expires.

If the short DRX cycle is used, at step 1h-45, the UE (re) starts drx-ShortCycleTimer.

Figure 9:
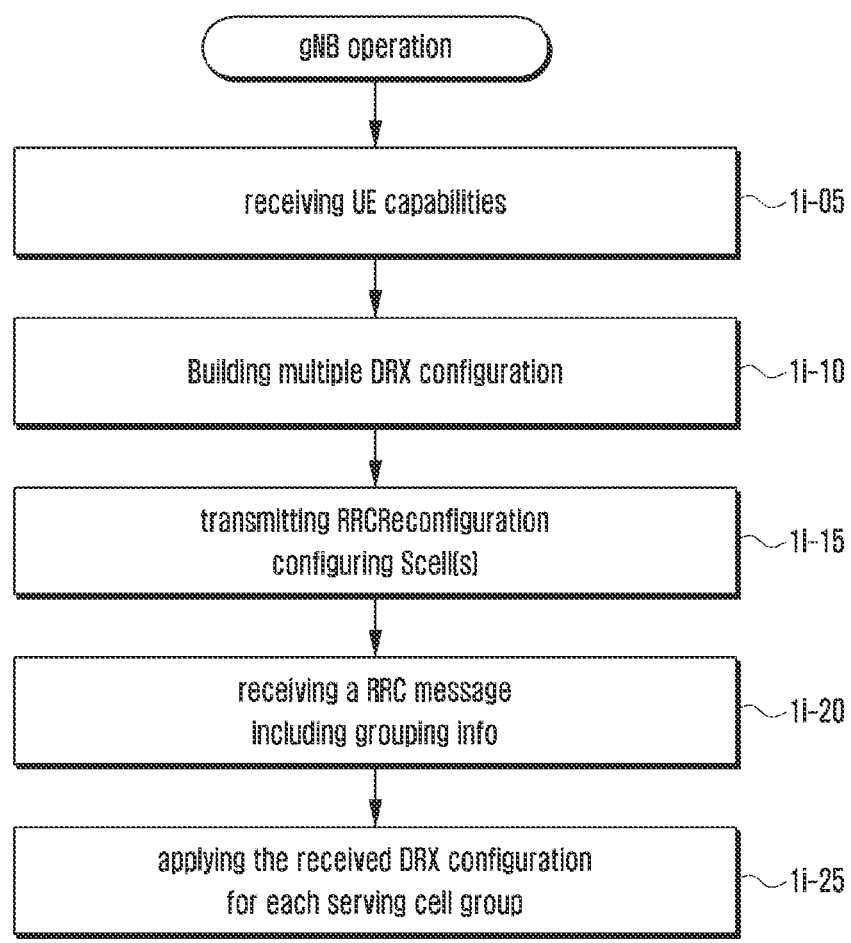
FIG. 9 is a diagram for explaining base station operation in the disclosure.

FIG. 9 is a diagram for explaining base station operation in the disclosure.

At step 1i-05, the base station receives a capability information report from one UE. This capability information includes an indicator indicating that the terminal can configure a plurality of DRXs when a plurality of serving cells are configured.

At step 1i-10, the base station composes plural pieces of DRX configuration information to reduce power consumption of the UE.

At step 1i-15, the base station configures an SCell to the connected mode UE.

At step 1i-20, the base station may receive preferred DRX group information from the UE.

At step 1i-25, the base station applies the configured DRX to serving cells belonging to the corresponding group.

Figure 10:
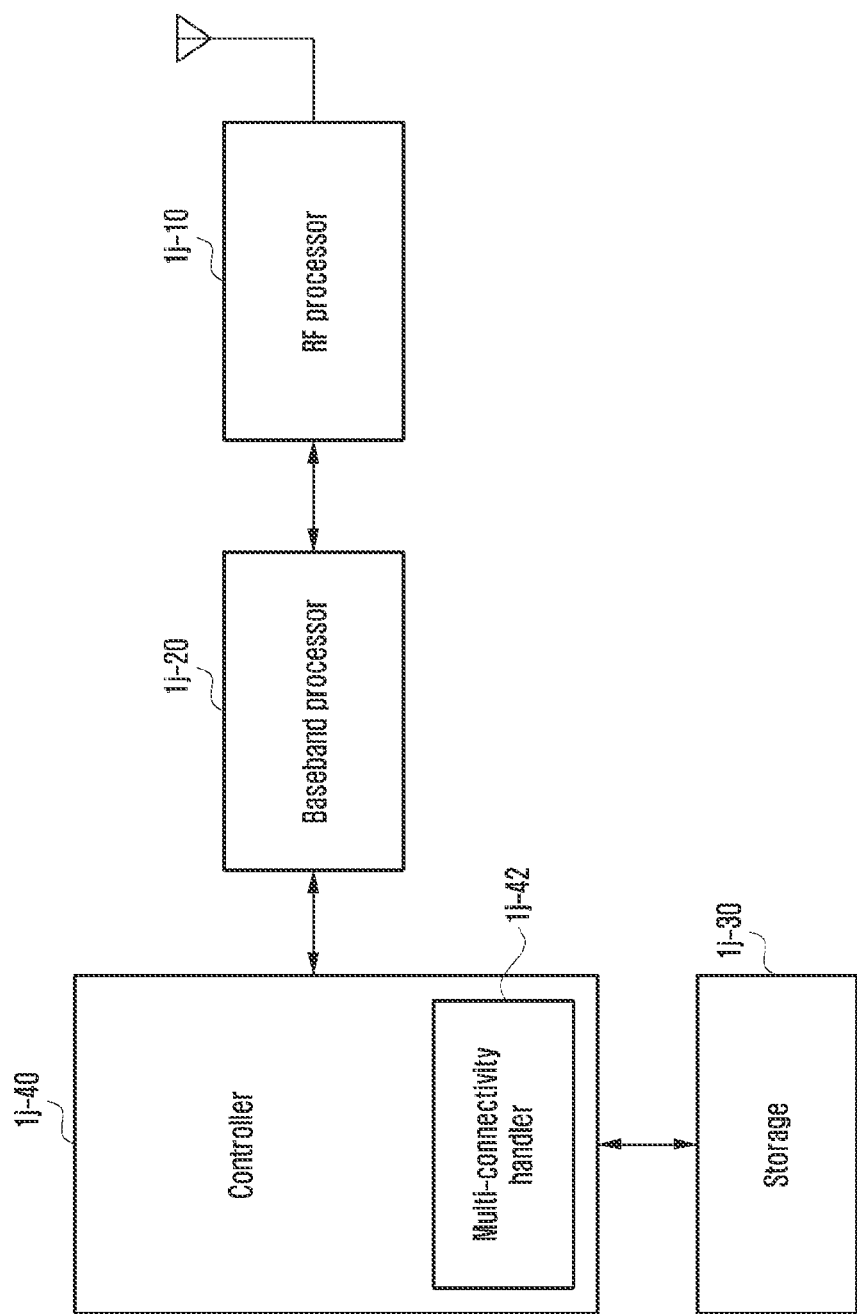
FIG. 10 is a block diagram illustrating the internal structure of a UE to which the disclosure is applied.

FIG. 10 is a block diagram illustrating the internal structure of a UE to which the disclosure is applied.

With reference to the drawing, the UE includes a radio frequency (RF) processor 1j-10, a baseband processor 1j-20, a storage 1j-30, and a controller 1j-40.

The RF processor 1j-10 performs a function for transmitting and receiving a signal through a radio channel, such as signal band conversion and amplification. That is, the RF processor 1j-10 performs up-conversion of a baseband signal provided from the baseband processor 1j-20 into an RF-band signal and transmits it through an antenna, and performs down-conversion of an RF-band signal received through the antenna into a baseband signal. For example, the RF processor 1j-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Also, the RF processor 1j-10 may include a plurality of RF chains. Further, the RF processor 1j-10 may perform beamforming. For beamforming, the RF processor 1j-10 may adjust phases and magnitudes of signals transmitted and received through the plural antennas or antenna elements. Further, the RF processor 1j-10 may perform MIMO, and may receive several layers during a MIMO operation.

The baseband processor 1j-20 performs conversion between a baseband signal and a bit string in accordance with the physical layer specification of the system. For example, during data transmission, the baseband processor 1j-20 generates complex symbols by encoding and modulating a transmission bit string. Further, during data reception, the baseband processor 1j-20 restores a reception bit string by demodulating and decoding a baseband signal provided from the RF processor 1j-10. For example, in the case of utilizing orthogonal frequency division multiplexing (OFDM), for data transmission, the baseband processor 1j-20 generates complex symbols by encoding and modulating a transmission bit string, maps the complex symbols to subcarriers, and composes OFDM symbols through inverse fast Fourier transform (IFFT) operation and cyclic prefix (CP) insertion. Further, for data reception, the baseband processor 1j-20 divides a baseband signal provided from the RF processor 1j-10 in units of OFDM symbols, restores the signals mapped to subcarriers through fast Fourier transform (FFT) operation, and restores the reception bit string through demodulation and decoding. The baseband processor 1j-20 and the RF processor 1j-10 transmit and receive signals as described above. Hence, the baseband processor 1j-20 and the RF processor 1j-10 may be called a transmitter, a receiver, a transceiver, or a communication unit. Further, to support different radio access technologies, at least one of the baseband processor 1j-20 or the RF processor 1j-10 may include a plurality of communication modules. In addition, to process signals of different frequency bands, at least one of the baseband processor 1j-20 or the RF processor 1j-10 may include different communication modules. For example, the different radio access technologies may include a wireless LAN (e.g., IEEE 802.11), a cellular network (e.g., LTE), and the like. Further, the different frequency bands may include a super high frequency (SHF) band (e.g., 2·NRHz, NRhz) and a millimeter wave (mmWave) band (e.g., 60 GHz).

The storage 1j-30 stores data such as basic programs, application programs, and configuration information for the operation of the UE. In particular, the storage 1j-30 may store information about a second access node that performs wireless communication using a second radio access technology. Further, the storage 1*j*-30 provides stored data in response to a request from the controller 1*j*-40.

The controller 1*j*-40 controls the overall operation of the UE. For example, the controller 1*j*-40 transmits and receives signals through the baseband processor 1*j*-20 and the RF processor 1*j*-10. Further, the controller 1*j*-40 writes or reads data to or from the storage 1*j*-30. To this end, the controller 1*j*-40 may include at least one processor. For example, the controller 1*j*-40 may include a communication processor (CP) for controlling communication and an application processor (AP) for controlling higher layers such as application programs.

Figure 11:
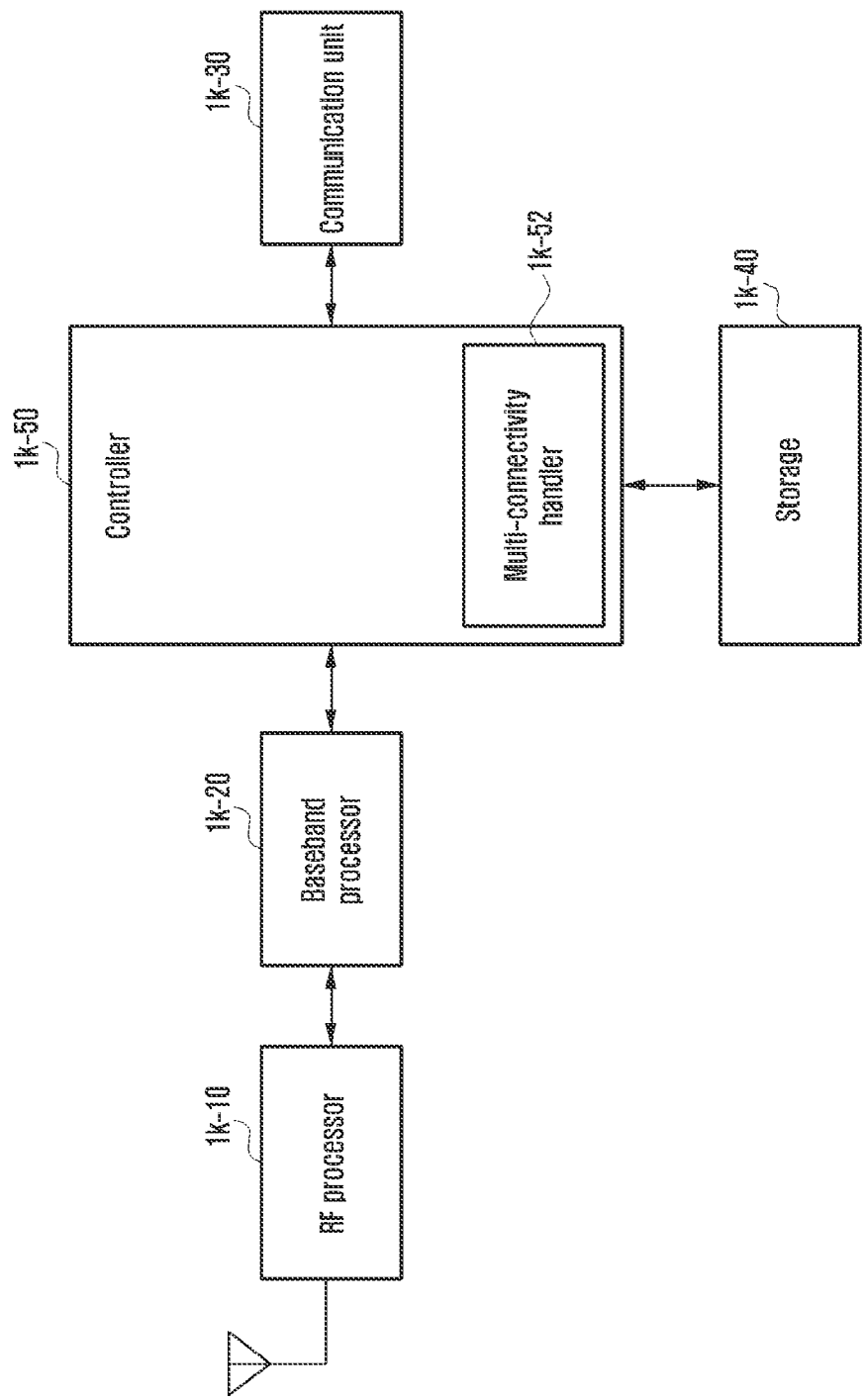
FIG. 11 is a block diagram showing the structure of a base station according to the disclosure.

FIG. 11 is a block diagram showing the structure of a base station according to the disclosure. As shown in the drawing, the base station includes an RF processor 1*i*-10, a baseband processor 1*i*-20, a backhaul communication unit 1*i*-30, a storage 1*i*-40, and a controller 1*i*-50. The RF processor 1*i*-10 performs a function for transmitting and receiving a signal through a radio channel, such as signal band conversion and amplification. That is, the RF processor 1*i*-10 performs up-conversion of a baseband signal provided from the baseband processor 1*i*-20 into an RF-band signal and transmits the converted signal through an antenna, and performs down-conversion of an RF-band signal received through the antenna into a baseband signal. For example, the RF processor 1*i*-10 may include a transmission filter, a reception filter, an amplifier, a mixer, an oscillator, a DAC, and an ADC.

Although only one antenna is illustrated in the drawing, the base station may be provided with a plurality of antennas. Additionally, the RF processor 1*i*-10 may include a plurality of RF chains. Further, the RF processor 1*i*-10 may perform beamforming. For beamforming, the RF processor 1*i*-10 may adjust phases and amplitudes of signals transmitted and received through plural antennas or antenna elements. The RF processor 1*i*-10 may perform downlink MIMO operation by transmitting one or more layers.

The baseband processor 1*i*-20 performs conversion between a baseband signal and a bit string in accordance with the physical layer specification of a first radio access technology. For example, for data transmission, the baseband processor 1*i*-20 generates complex symbols by encoding and modulating a transmission bit string. Further, for data reception, the baseband processor 1*i*-20 restores a reception bit string by demodulating and decoding a baseband signal provided from the RF processor 1*i*-10. For example, in the case of utilizing OFDM, for data transmission, the baseband processor 1*i*-20 generates complex symbols by encoding and modulating a transmission bit string, maps the complex symbols to subcarriers, and composes OFDM symbols through IFFT operation and CP insertion. Further, for data reception, the baseband processor 1*i*-20 divides a baseband signal provided from the RF processor 1*i*-10 in units of OFDM symbols, restores the signals mapped to the subcarriers through FFT operation, and restores the reception bit string through demodulation and decoding. The baseband processor 1*i*-20 and the RF processor 1*i*-10 transmit and receive signals as described above. Hence, the baseband processor 1*i*-20 and the RF processor 1*i*-10 may be called a transmitter, a receiver, a transceiver, a communication unit, or a wireless communication unit.

The backhaul communication unit 1*i*-30 provides an interface for communication with other nodes in the network. That is, the backhaul communication unit 1*i*-30 converts a bit string, which is transmitted from a main base station to another node such as an auxiliary base station or the core network, into a physical signal, and converts a physical signal received from the other node into a bit string.

The storage 1*i*-40 stores data such as basic programs, application programs, and configuration information for the operation of the main base station. In particular, the storage 1*i*-40 may store information on a bearer allocated to a connected UE and measurement results reported from the connected UE. Further, the storage 1*i*-40 may store information used as a criterion for determining whether to provide or suspend multi-connectivity to the UE. In addition, the storage 1*i*-40 provides stored data in response to a request from the controller 1*i*-50.

The controller 1*i*-50 controls the overall operation of the main base station. For example, the controller 1*i*-50 transmits and receives signals through the baseband processor 1*i*-20 and the RF processor 1*i*-10 or through the backhaul communication unit 1*i*-30. Further, the controller 1*i*-50 writes or reads data to or from the storage 1*i*-40. To this end, the controller 1*i*-50 may include at least one processor.

In the above-described embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements. Meanwhile, the embodiments of the disclosure disclosed in the present specification and drawings are provided as specific illustrations to easily explain the technical contents of the disclosure and help the understanding of the disclosure, and are not intended to limit the scope of the disclosure. That is, it should be understood by those skilled in the art that many variations and modifications of the technical concept described herein will still fall within the scope of the disclosure. In addition, the above embodiments may be carried out in combination with each other as needed. For example, a base station and a terminal may be operated by combining some of a plurality of embodiments of the disclosure. In addition, the embodiments of the disclosure are applicable to other communication systems, and other modifications based on the technical spirit of the embodiments may also be carried out. For example, the embodiments may also be applied to LTE systems, 5G or NR systems, and the like.

The invention claimed is:

1. A method performed by a terminal in a wireless communication system, the method comprising:
receiving, from a base station, first discontinuous reception (DRX) configuration information for a first DRX group and second DRX configuration information for a second DRX group;
performing physical downlink control channel (PDCCH) monitoring for the first DRX group in a first active time based on the first DRX configuration information, and performing PDCCH monitoring for the second DRX group in a second active time based on the second DRX configuration information;
receiving, from the base station, a medium access control (MAC) control element (CE) associated with a DRX cycle in one of the first DRX group and the second DRX group; and
using one DRX cycle for each of the first DRX group and the second DRX group, based on the MAC CE, wherein the first DRX group and the second DRX group are determined based on a frequency range (FR).

2. The method of claim 1, further comprising:
transmitting, to the base station, capability information on whether the terminal supports the second DRX group,
wherein the second DRX configuration information is received based on the capability information.

3. The method of claim 1, further comprising:
receiving, from the base station, configuration information on a serving cell; and
identifying a DRX group to which the serving cell belongs based on the configuration information,
wherein the second DRX configuration information includes information on drx-ondurationtimer and information on drx-inactivitytimer.

4. A method performed by a base station in a wireless communication system, the method comprising:
transmitting, to a terminal, first discontinuous reception (DRX) configuration information for a first DRX group and second DRX configuration information for a second DRX group;
transmitting a physical downlink control channel (PDCCH) for the first DRX group using a first active time based on the first DRX configuration information, and transmitting the PDCCH for the second DRX group using a second active time based on the second DRX configuration information; and
transmitting, to the terminal, a medium access control (MAC) control element (CE) associated with a DRX cycle for one of the first DRX group and the second DRX group,
wherein one DRX cycle is used for each of the first DRX group and the second DRX group, based on the MAC CE, and
wherein the first DRX group and the second DRX group are determined based on a frequency range (FR).

5. The method of claim 4, further comprising:
receiving, from the terminal, capability information on whether the terminal supports the second DRX group,
wherein the second DRX configuration information is transmitted based on the capability information, and
wherein the second DRX configuration information includes information on drx-ondurationtimer and information on drx-inactivitytimer.

6. A terminal in a wireless communication system, the terminal comprising:
a transceiver; and
a controller configured to:
control the transceiver to receive, from a base station, first discontinuous reception (DRX) configuration information for a first DRX group and second DRX configuration information for a second DRX group,
perform physical downlink control channel (PDCCH) monitoring for the first DRX group in a first active time based on the first DRX configuration information, and perform PDCCH monitoring for the second DRX group in a second active time based on the second DRX configuration information,
control the transceiver to receive, from the base station, a medium access control (MAC) control element (CE) associated with a DRX cycle in one of the first DRX group and the second DRX group, and
use one DRX cycle for each of the first DRX group and the second DRX group, based on the MAC CE,
wherein the first DRX group and the second DRX group are determined based on a frequency range (FR).

7. The terminal of claim 6,
wherein the controller is further configured to control the transceiver to transmit, to the base station, capability information on whether the terminal supports the second DRX group, and
wherein the second DRX configuration information is received based on the capability information.

8. The terminal of claim 6,
wherein the controller is further configured to control the transceiver to receive, from the base station, configuration information on a serving cell, and identify a DRX group to which the serving cell belongs based on the configuration information, and
wherein the second DRX configuration information includes information on drx-ondurationtimer and information on drx-inactivitytimer.

9. A base station in a wireless communication system, the base station comprising:
a transceiver; and
a controller configured to:
control the transceiver to transmit, to a terminal, first discontinuous reception (DRX) configuration information for a first DRX group and second DRX configuration information for a second DRX group;
control the transceiver to transmit a physical downlink control channel (PDCCH) for the first DRX group using a first active time based on the first DRX configuration information, and transmitting the PDCCH for the second DRX group using a second active time based on the second DRX configuration information; and
control the transceiver to transmit, to the terminal, a medium access control (MAC) control element (CE) associated with a DRX cycle for one of the first DRX group and the second DRX group,
wherein one DRX cycle is used for each of the first DRX group and the second DRX group, based on the MAC CE, and
wherein the first DRX group and the second DRX group are determined based on a frequency range (FR).

10. The base station of claim 9,
wherein, in case that the first DRX configuration information includes information on a short DRX cycle, the one DRX cycle is the short DRX cycle,
wherein, in case that the first DRX configuration information does not include the information on the short cycle, the one DRX cycle is a long DRX cycle,
wherein the controller is further configured to control the transceiver to receive, from the terminal, capability information on whether the terminal supports the second DRX group, and transmit the second DRX configuration information based on the capability information, and
wherein the second DRX configuration information includes information on drx-ondurationtimer and information on drx-inactivitytimer.

11. The method of claim 1, further comprising:
stopping a timer, in case that the timer is running in at least one of the first DRX group or the second DRX group, wherein the timer is one of an inactivity timer (drx-inactivitytimer) or an on-duration timer (drx-ondurationtimer),
wherein, in case that the short DRX cycle is configured based on the first DRX configuration, a short cycle timer is started for each of the first DRX group and the second DRX group after the MAC CE is received.

12. The method of claim 1, further comprising:
identifying that a DRX inactivity timer (drx-inactivitytimer) for at least one of the first DRX group or the second DRX group is expired; and
in case that a short DRX cycle is configured based on the first DRX configuration, starting a short cycle timer for the at least one of the first DRX group or the second DRX group, after an expiry of the drx-inactivitytimer.

13. The method of claim 4,
wherein, in case that the first DRX configuration information includes information on a short DRX cycle, the one DRX cycle is the short DRX cycle, and
wherein, in case that the first DRX configuration information does not include the information on the short cycle, the one DRX cycle is a long DRX cycle.

14. The terminal of claim 6,
wherein the controller is further configured to stop, a timer, in case that the timer is running in at least one of the first DRX group or the second DRX group, wherein the timer is one of an inactivity timer (drx-inactivitytimer) or an on-duration timer (drx-ondurationtimer), and
wherein, in case that the short DRX cycle is configured based on the first DRX configuration a short cycle timer is started for each of the first DRX group and the second DRX group after the MAC CE is received.

15. The terminal of claim 6,
wherein the controller is further configured to identify that a DRX inactivity timer (drx-inactivitytimer) for at least one of the first DRX group or the second DRX group is expired, and in case that a short DRX cycle is configured based on the first DRX configuration, start a short cycle timer for the at least one of the first DRX group or the second DRX group, after an expiry of the drx-inactivitytimer.

\* \* \* \* \*